Nov. 12, 1935.  A. B. SCOTT  2,020,521
PROJECTING APPARATUS
Filed May 7, 1932  4 Sheets-Sheet 1

Fig. 1

Inventor
Albert B. Scott
By Lyon & Lyon
Attorneys

Nov. 12, 1935.  A. B. SCOTT  2,020,521

PROJECTING APPARATUS

Filed May 7, 1932  4 Sheets-Sheet 3

Inventor
Albert B. Scott
By Lyon & Lyon Attorneys

Nov. 12, 1935.  A. B. SCOTT  2,020,521

PROJECTING APPARATUS

Filed May 7, 1932  4 Sheets-Sheet 4

Patented Nov. 12, 1935

2,020,521

UNITED STATES PATENT OFFICE 2,020,521

PROJECTING APPARATUS

Albert B. Scott, Los Angeles, Calif., assignor of one-third to J. Rex Cole and one-third to Henry King, both of Los Angeles, Calif.

Application May 7, 1932, Serial No. 609,868

21 Claims. (Cl. 88—18.7)

This invention relates to motion picture projecting apparatus, and this application, as to part of its subject matter, is a continuation of my prior application, entitled Projecting apparatus, filed May 11, 1931, Serial No. 536,352, issued as Patent No. 1,940,148.

The apparatus employed for practicing this invention involves the use of an endless film, the principal portion of which is carried in a coil, or coils, in a magazine from which the film is fed past the lens, or lenses, of the projecting apparatus, and then fed back into the magazine at another point on the coil, or coils.

The general object of this invention is to provide simple means for effecting this.

A further object of the invention is to provide a magazine capable of carrying a coil of an endless film, and provided with simple means for effecting the withdrawal of the film from the magazine, to enable the same to be advanced past the projecting lens, or lenses, and returned automatically to the coil in the magazine. These operations are effected automatically.

A further object of the invention is to produce a magazine for carrying a relatively large quantity of film, and provided with means for effecting the automatic feeding of the film from the magazine and the automatic return of the film to the magazine.

In the preferred construction of the magazine, to give the same a relatively large capacity and enable it to carry a relatively long endless film, the magazine is constructed to accommodate a plurality of annular coils of the film, and is provided with means for effecting passage of the film between the annular coils, and one of the objects of the invention is to provide the magazine with means for effecting rotation of the coils to prevent any possibility of the plies or layers of the coils becoming tight or jammed as they are being fed through the magazine.

A further object of the invention is to improve the general construction of a magazine for holding a relatively large supply of film in the form of a coil, and provided with simple means for automatically feeding the film into and out of the magazine.

Further objects of the invention will appear hereinafter.

The invention consists of novel parts and combinations of parts to be described hereinafter, all of which contribute to produce an efficient projecting apparatus.

A preferred embodiment of the invention is described in the following specification, while the broad scope of the invention is pointed out in the appended claims.

Figure 1:
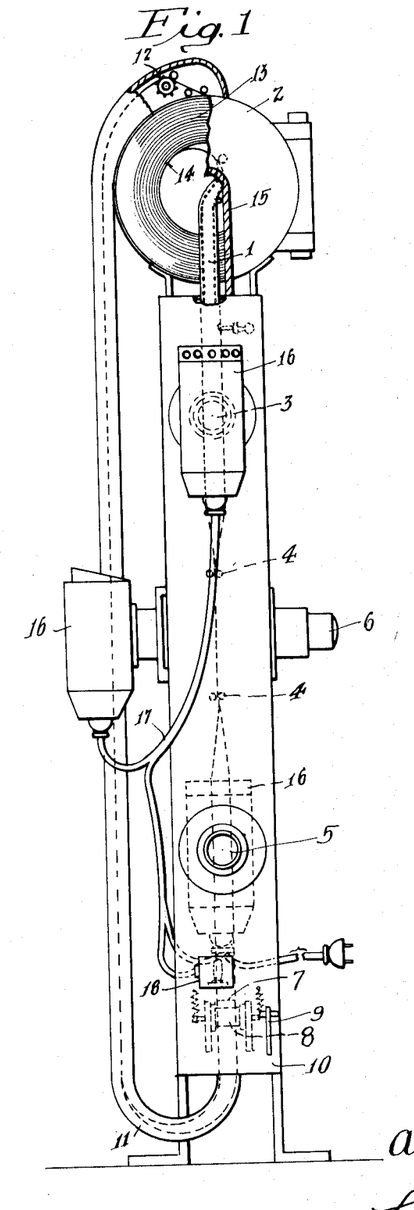
Figure 1 is a side elevation, partly broken away, and illustrating the projecting apparatus embodying my invention, and also illustrating the general construction of such an apparatus, and the way in which the film is controlled to advance it past the lens, or lenses, of the projecting devices, and returned to the magazine.

Before proceeding to a more detailed description of the invention, it should be stated that a projecting apparatus illustrated as in Figure 1 is employed for enabling pictures to be projected in different directions, though using a single endless film.

As the film passes through the projecting apparatus, it moves past an uppermost lens that projects a picture in one direction, and before it leaves the apparatus, it passes another lens that projects a picture in a general opposite direction from the first picture. Between the uppermost and the lowermost lens, the film has a twist in it which brings it into a plane substantially at right angles to the plane which the film occupies in passing the other lenses, and at this point, the film cooperates with another lens to project a picture in a direction substantially at right angles to the direction in which the other two lenses project their pictures. This part of the invention is a division of my prior application referred to above.

Figure 2:
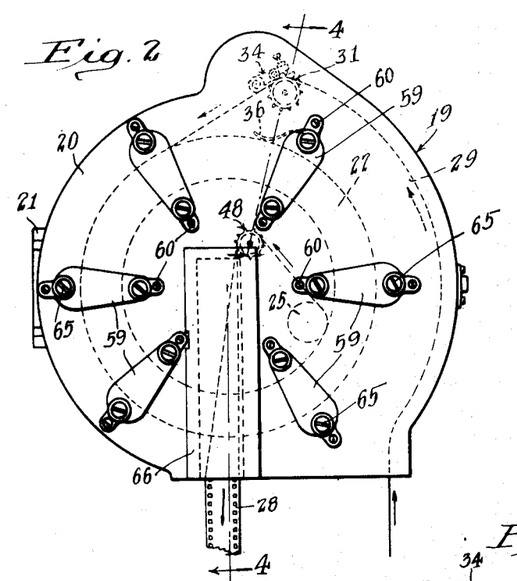
Figure 2 is a side elevation of a magazine embodying my invention for cooperating with a machine of this character, and in which the film is carried in the magazine in a single coil; this view particularly illustrates the path of the film in passing into the magazine, and also illustrates the guide at the side of the casing through which the film passes outwardly. The magazine illustrated in Figure 2, however, is not identical in design to the magazine illustrated in Figure 1, that is, it has a horizontal lower face which enables it to seat directly on the main casing of the projecting apparatus, so that the guide for the film, as it passes into the magazine, is formed directly within the body of the casing of the magazine.
Figure 3:
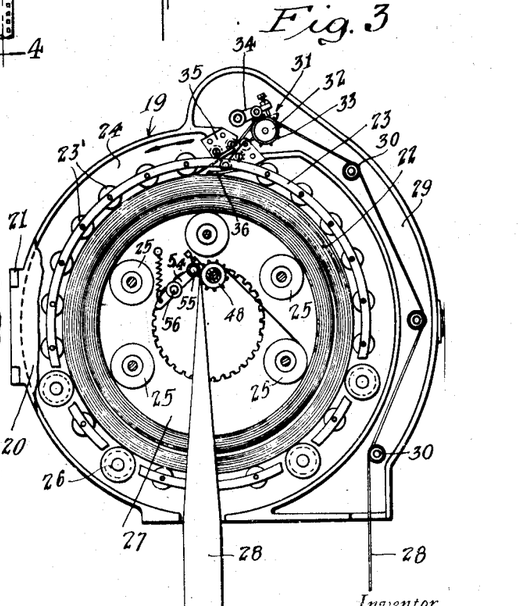
Figure 3 is a side elevation further illustrating the magazine, as shown in Figure 2, but with the cover plate of the magazine swung open, so as to show the mechanism on the interior of the magazine in side elevation.

In the type of machine illustrated in Figure 1, where the film is not of great length, the magazine is constructed as illustrated in Figures 2 and 3 to accommodate a single annular coil up to 650 ft. for example.

In its general construction, the magazine illustrated in Figure 3 is provided with means for supporting a single annular coil, and is provided with means for effecting rotation of the coil in the casing. The magazine is provided with means for feeding film into it and withdrawing the film from it.

In the embodiment of the invention illustrated, the film is fed into the magazine so as to pass onto the outer periphery of the coil, and the delivery feed device, which delivers the film from the coil, takes the film from the inner periphery of the coil.

In practicing my invention, however, the magazine may be constructed so as to accommodate a relatively long endless film. When in use, the film will pass automatically from this magazine, through a projecting apparatus, and then return automatically and be fed back into the magazine.

Where it is necessary to accommodate a large supply of film in the magazine, I prefer to construct the magazine so that it will carry a plurality of concentrically disposed annular coils. The magazine is constructed so that these coils are caused to rotate in the feeding direction, and cooperate with feeding mechanism to feed film that has passed the projecting lens back into the magazine.

In the preferred construction illustrated, the film, returning from the lens, is fed onto the outer periphery of the outermost coil, and the film that is to go to the lens is drawn off from the inner periphery of the innermost coil.

One of the problems in handling a coil of this character in a magazine is to provide for the general advance of the individual layers of the coil at approximately the same linear speed. I have found in practice that it is not merely sufficient to rotate the coil as a whole at a certain annular velocity, but it is necessary to insure that the general advance of the individual layers of the film in the coil will be at the same linear speed. This difficulty is not so marked in a magazine of the type shown in Figure 3 for handling a relatively small quantity of film, but in handling a large supply of film in a magazine, it is desirable to divide the supply up into several coils, and it is also preferable to construct the driving plate which assists in effecting the advance of the film in the coils, in sections, the faces of which touch the sides of the coil, and these sections are not driven at the same annular velocity, but in such a way that their faces where they touch the film move at substantially the same linear speed. In this way, a tendency to jamming or tightening of the film at any point in the magazine is avoided. The use of several annular coils in this way makes it advisable to provide feeding devices for feeding the film from one coil to the next.

Figures 8, 9, 10, 11:
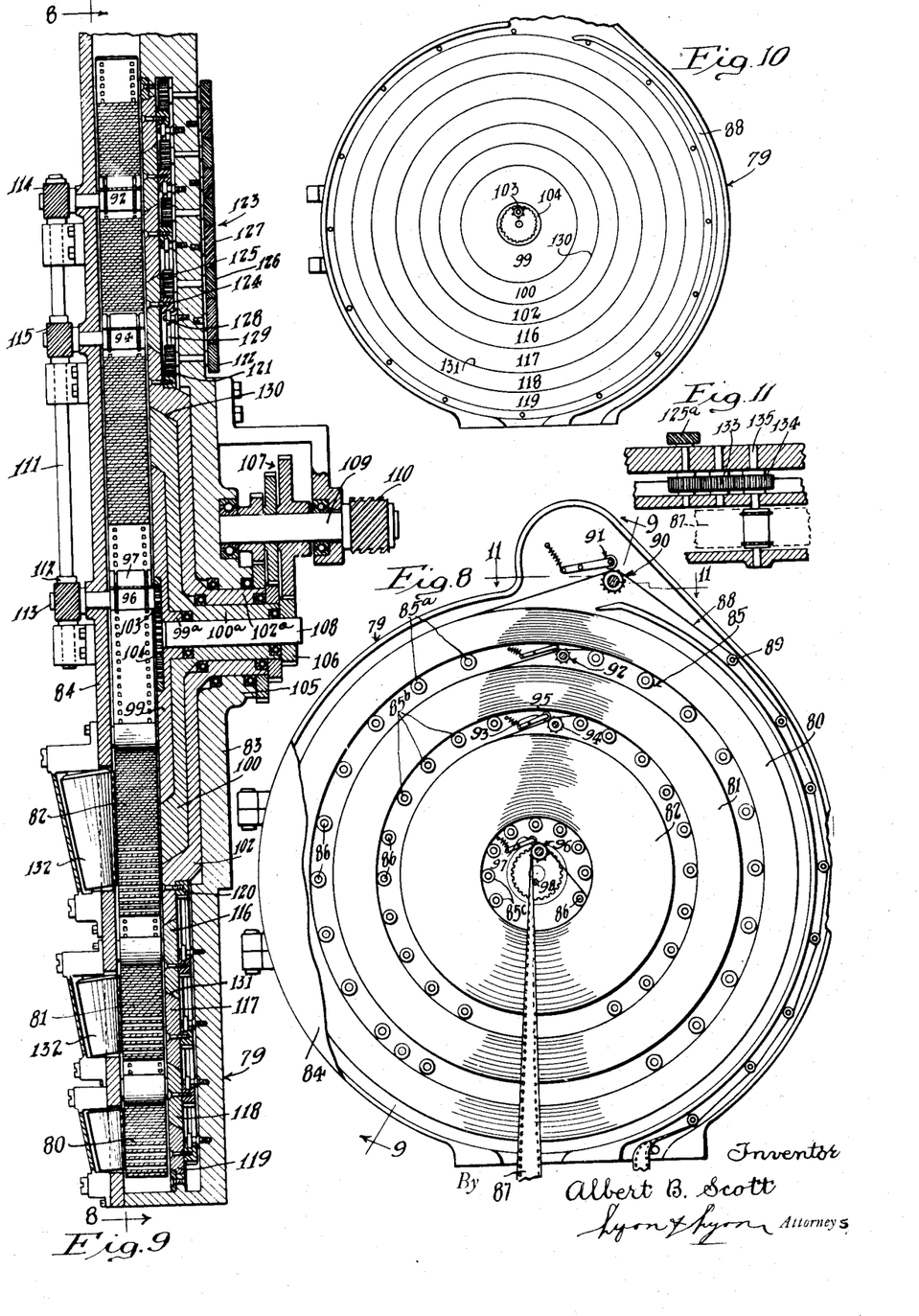
Figure 8 is a side elevation of a magazine illustrating another embodiment of the magazine for accommodating a relatively large supply of film disposed in several coils; in this view, the principal portion of the cover plate of the magazine is broken away, and only the portion of the cover plate near the hinge is illustrated; this view may be regarded as a section on the line 8—8 of Figure 9, but upon a reduced scale.
Figure 9 is a section taken on the line 9—9 of Figure 8, but upon a greatly enlarged scale, and particularly illustrating the means for supporting the coil in the magazine effecting its rotation, and effecting its feeding movement between the different coils and into and out of the magazine.
Figure 10 is a front elevation of the driving plate which lies against the sides of the several coils in the magazine that is driven to facilitate rotation of the coils; this view particularly illustrates the sectional character of this driving plate, and also a portion of the casing of the magazine broken away.
Figure 11 is a horizontal section taken about on the line 11—11 of Figure 8, and particularly illustrating the means for driving the feed device which feeds the film into the magazine; in this view, portions of the walls of the casing and adjacent parts are broken away.

In the present embodiment of the invention, as illustrated in Figure 8, the film passes onto the outer periphery of the outermost or largest coil, and passes from the inner periphery of this coil to the outer periphery of the next coil. In the present instance, the next coil is an intermediate coil in view of the fact that I have illustrated three of these annular coils. From the intermediate coil, the film passes to the innermost coil, and the central feeding device operates to withdraw film from the inner periphery of the inner coil.

In the operation of the apparatus illustrated in Figure 1, an endless film 1 is fed down from a holder or magazine 2, in a position to present its flat face at right angles to the axis of a lens 3 illustrated in dotted outline. As the film passes below the lens 3, it passes through two sets of guide rollers 4 (illustrated in dotted lines) that form a twist in the film, so as to turn its plane through an angle of 180° before it passes into the guide of the lowest projecting mechanism of the lens 5; in other words, at an intermediate point between the lenses 3 and 5, the "flat" of the film is disposed at right angles to the axis of an intermediate lens 6, thereby enabling this lens to project pictures onto a screen which lies in a plane substantially at right angles to the plane of screens which could receive the pictures from the lenses 3 and 5. The lenses 3, 5, and 6 are, of course, located a distance apart corresponding to the width of the "frames" or pictures, of the film measured longitudinally with the film.

In order to enable the pictures to be properly framed, I provide the film beyond the lowest lens 5 with a framing loop 7 in which "floats" a roller 8 (indicated in dotted lines) carried on a framing lever 9, and this lever is provided with a handle which can be moved whenever desired to lower or raise the "frames" at the lenses. Beyond the framing roller 8, the film passes downwardly out of the casing 10 of the apparatus and down into a guide duct 11 which completely encloses the film and cools the film while guiding it back to a point near the upper side of the magazine 2. This guide duct 11 is curved at its lower end to hold a loop in the film which is advancing through it.

At the upper end of the guide chute, it connects to the upper side of the magazine 2, and at this point, the film passes over a feed device 12 which passes the film into the magazine and wraps it on the outer periphery of a coil 13 of film within the magazine. The film in the coil is driven in a rotary direction, and at the inner periphery 14 of the coil, the film is drawn off from the coil and passes down out of the magazine through a guide 15.

The apparatus illustrated in Figure 1 is provided with the usual lamps such as the lamps 16 to cooperate with their corresponding lenses and an electric cord 17 may be provided with a sound reproduction device indicated at 18 for reproducing sounds relating to the pictures projected from the film.

In Figures 2 and 3, I illustrate a magazine of the same type illustrated in Figure 1, that is to say, it is capable of accommodating a single coil of film. However, the design of this magazine differs slightly from that of the magazine illustrated in Figure 1, because the base of this magazine is constructed to seat directly on the upper end of a casing such as the casing 10 illustrated in Figure 1.

The magazine illustrated in Figures 2 and 3 comprises the casing 19 of substantially circular form, that is, it is in a form of a relatively thin drum, and this casing is provided with a movable cover plate 20 which is preferably connected to it by hinge connection 21.

Figures 4, 5, 6, 7:
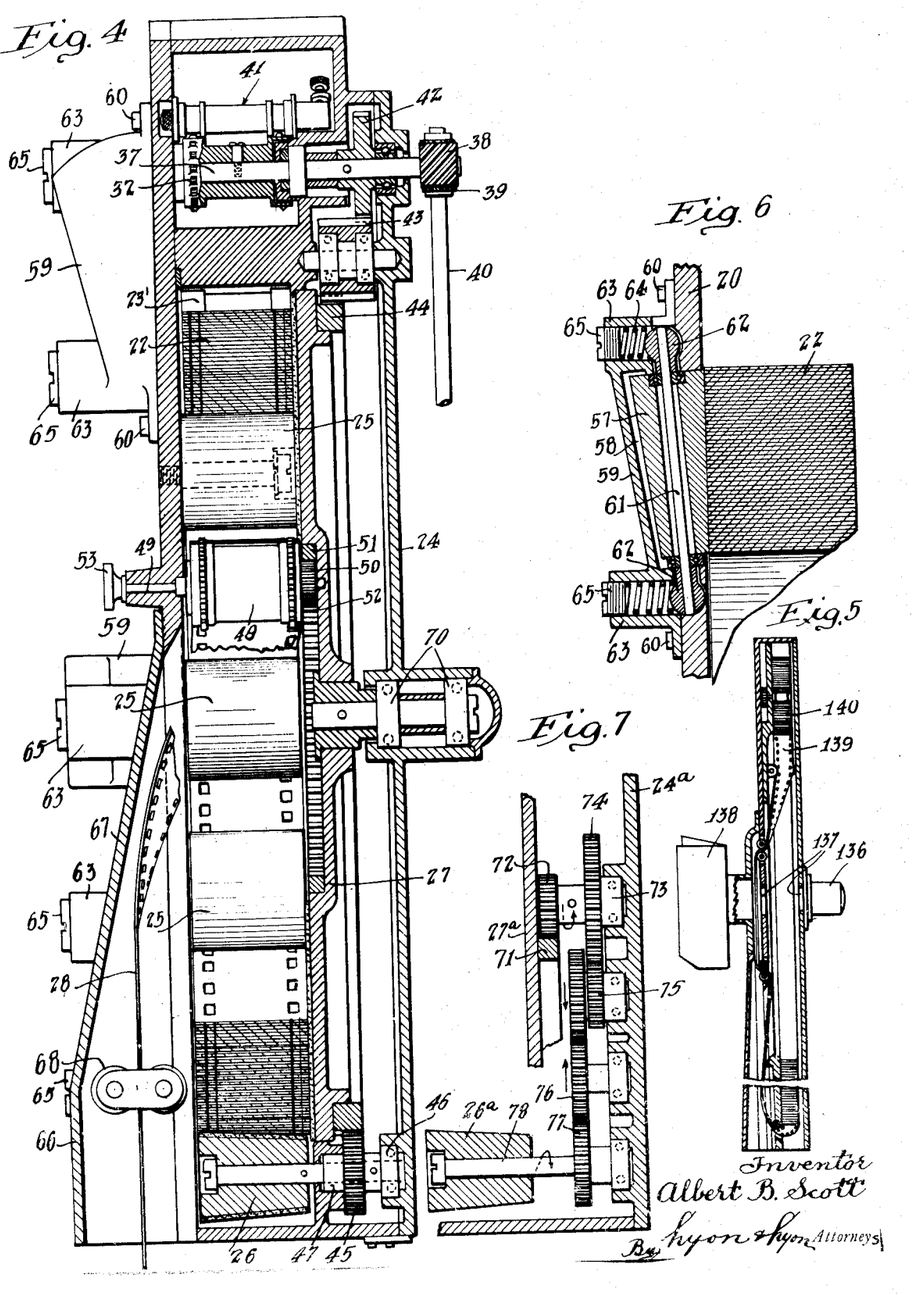
Figure 4 is a vertical section through the magazine illustrated in Figure 2 taken about on the line 4—4 of Figure 2, but upon a greatly enlarged scale, particularly illustrating the means for supporting and rotating the coil of film, and for feeding the same into and out of the magazine.
Figure 5 is a vertical section through a magazine and projecting apparatus, and illustrating an embodiment of the invention in which a central opening is provided in the magazine to enable the picture from the film to be projected through a lens having its axis coinciding with the central opening through the casing; this view is shown partly in elevation.
Figure 6 is a longitudinal section upon an enlarged scale taken in a general radial direction on the casing illustrated in Figure 3, and passing through a guide roller which constitutes a feature of the invention; a number of these rollers are used on the sides of the coil, or coils, to facilitate the rotation of the coils.
Figure 7 is a vertical section corresponding to the bottom portion of Figure 4, but illustrating another embodiment of the invention in regard to the mechanism for driving certain rollers, or rotary members, which are preferably employed in the construction to support the sag portion of a coil, and which cooperate to assist in effecting the rotation of the coil.

The details of this magazine illustrated in Figure 3 are shown more fully in Figure 4 which is a sectional view. The interior of the casing is provided with means for supporting and rotating a coil 22 which coil is of annular form. For this purpose, I provide an annular wall 23 which is attached to the back wall 24 of the casing and projects inwardly from the back wall, and in this wall 23, I provide a plurality of small rollers 23', the faces of which project inwardly toward the axis of the drum so as to guide the outermost layer of film in the coil. While these small rollers 23' are disposed circumferentially around the entire outer periphery of the coil 22, it should be understood that these rollers are merely idlers, and simply rotate freely when the outer layer of the coil happens to engage them. The coil is supported preferably by two sets of rollers, an inner set consisting of a plurality of circumferentially disposed rollers 25 disposed in the opening at the center of the coil, and an outer set of rollers 26 which are mounted under the lower side of the coil. These latter rollers will support the coil if it sags down onto them, and this lower set of rollers is preferably power driven, and if the coil sags out then they will cooperate with a rotary driving plate 27 to effect a rotation of the coil in the direction indicated by the arrow in Figure 3, that is, in anti-clock-wise direction as viewed in this figure. The rollers 25 are preferably mounted on the inner face of the cover 20.

In this way, it will be seen that between the rollers 25 and the rollers 23' an annular space is formed in the casing which receives the coil 22. The film 28 indicated in the dotted line in Figure 3 passes up into the casing 19 from the main casing of the machine, and is received in an arcuate guide duct 29 formed in the casing, and this duct may be provided with guiding rollers 30 over which the film passes on its way to a feeding device 31 which is located in the casing above the coil. This feeding device comprises a feed roller 32 with the usual sprocket teeth 33 which engage the usual perforations near the edges of the film so as to pull the film up through the guide 29 and pass the same downwardly between two sets of guide rollers 34 mounted in the frame plates 35. From this point, the film passes downwardly through a small opening in the wall 23 and wraps on the outer periphery of the rotating coil 22. One of the frame plates 35 may be provided with a light leaf spring 36 that exerts light pressure on the upper periphery of the coil opposite to one of the inner rollers 25. Any suitable means may be provided for driving this feed device and for driving the driving plate 27 and the lower rollers 26. For this purpose, and referring to Figure 4, the feed roller 32 is provided with a shaft 37 which extends through the back wall 24 of the casing and is provided with a pinion or small gear 38 which meshes with a gear 39 carried on a driving shaft 40. These gears 38 and 39 are properly proportioned to cooperate with the shaft 40 to drive the feed roller 32 at the proper speed to give the film the same linear speed which it has in passing the projecting lenses illustrated in Figure 1.

Cooperating with the feed roller, the usual spring pressed presser roller 41 may be provided to hold the film against the feed roller 32.

In order to drive the driving plate 27, the shaft 37 is provided with a gear 42 (see Figure 4) which meshes with a long pinion 43 which is an idler mounted in the casing, and which engages on its under side with a gear wheel 44 in the form of a ring which is attached to the back face of the driving plate 27.

In order to drive the lower rollers 26, the under side of this gear wheel or ring 44 meshes with pinions 45 carried on the shafts of the rollers 26 respectively. These rollers 26 are supported in suitable roller bearings 46, and a similar roller bearing 47 may be provided for the pinion 43. If desired, a similar roller bearing may be provided for the shaft 37.

In order to insure that the side of the coil will rest against the face of the driving plate 27, the magazine may, if desired, be mounted in a slightly inclined position, but I prefer to mount the magazine casing with its middle plane in a substantially vertical plane and I cause the coil to hold itself up against the driving plate 27 by making the rollers 26 of slightly conical form with the large end of each roller disposed remote from the driving plate. With this form of roller, it will be evident that the coil tends to slip on the rollers 26 over against the driving plate. This action cooperates with side presser rollers that engage the side of the coil as will be presently described.

The magazine is provided with means for withdrawing film from it, and in the present instance, the film is withdrawn from the inner periphery of the coil. Referring to Figure 3, it will be noted that one of the rollers 25 disposed at a low level performs the function of a guide roller over which the film 28 passes in an inclined upward direction so that it can pass in a loop over the upper side of a delivery feed roller 48. This feed roller is indicated in dotted lines within the casing in Figure 3, because it is supported on the cover plate 20, and when the cover plate is open, this feed roller moves away from the interior of the casing as the cover or door is swung open. This feed roller is carried on a shaft 49 (see Figure 4) which carries pinion 50 at its inner end and this pinion meshes with and is driven by an internal gear wheel 51 in the form of a ring that is set in a recess 52 in the inner face of the driving plate 27.

The outer end of the shaft 49 projects on the outer side of the cover and is provided with a thumb head 53, the purpose of which will be described hereinafter.

Adjacent to the shaft 49, a small presser lever 54 is provided (indicated in dotted lines in Figure 3) and this presser lever carries the usual presser roller 55, also indicated in dotted lines which holds the film against the feed roller 48. This feed roller is provided with the usual sprocket teeth to engage the perforations in the film. The presser lever 54 is attached on the inner side of the cover 20 by means of a pin 56 (indicated in dotted lines in Figure 3).

In order to assist in holding the coil 22 up against the driving plate or disk 27, I provide a plurality of spring pressed rollers 57 which are mounted on the inner face of the cover plate. These rollers are preferably of conical form, and in this type of machine, the large ends of the rollers are disposed inwardly in a radial direction with respect to the central axis of the casing. The details of the mounting on one of these rollers are illustrated in Figure 6, and each roller is received in a roller pocket 58 either formed in the wall of the plate or formed in a small roller housing 59 which is fastened on the outer side of the cover plate by machine screws 60. In order to spring press these rollers toward the coil, the shaft 61 of each roller is carried in the ball 62 at each end and each of these balls is located at the inner end of spring barrel 63 formed in the end of the roller housing. Each spring barrel carries a coil spring 64 which thrusts against the outer side of the ball, and the force of the spring exerts itself to press the inner face of the roller toward the coil. A screw plug 65 is provided in each spring barrel which may be screwed up more or less to adjust the amount of compression of the springs 64.

In order to facilitate the withdrawal of the film from the delivery feed roller 48, the cover plate 20 is provided with a substantially vertical guide 66 (see Figures 2 and 4). This guide extends downwardly from a point near an opening through the cover plate at its center, and the outer wall 67 of the guide preferably inclines away from the casing in a downward direction. Near the lower end of this guide 66 two oppositely disposed guide rollers 68 are provided between which the film 28 passes downwardly as it passes into the main casing of the projecting apparatus.

Just above the upper end of this guide way 66 and within the casing, I prefer to provide an inclined guide roller 69 (see Figure 4). The axis of this roller is inclined so that it is raised toward the cover plate, and the axis of the roller is nearly in a vertical plane. This enables the roller 69 to cooperate more effectively with the guide roller 68 which is mounted in the interior of the guide 67 in an inclined position in a horizontal plane. In this way, as the film passes out of the magazine, it is delivered from the roller 68 with the "flat" of the film disposed in about the right plane to enable it to pass down into the main casing of the machine. The driving plate 27 is supported at its center in a suitable ball bearing 70 (see Figure 4).

The construction shown in Figure 4 shows the rotating of the rollers 26 directly through pinions 45 meshing with the gear 44 which drive these rollers 26 at substantially the same peripheral speed as that of the feed roller 32. This, of course, will depend somewhat on the ratio of the gear wheel 42 and its pinion 43. If it is desired to drive the rollers 26 at a considerably greater peripheral speed so as to enable them to give greater assistance in the general rotary movement of the coil 22, I may drive these rollers by the means indicated in Figure 7. Now to accomplish this, I provide the back of the driving plate indicated by the numeral 27a with an internal gear wheel 71 which meshes with the pinion 72 carried in a suitable bearing 73 in the back plate 24a of the casing. This pinion is rigid with a larger gear 74 which drives a gear train 75 that is mounted in the back wall 24a which steps up the peripheral speed and which includes an idler 76 which drives a gear wheel 77 on the shaft 78 of the roller 26a.

In this connection, it should be understood that this construction must be duplicated for each of the rollers 26a which correspond to the rollers 26 of Figure 3.

Referring to Figures 8–11, another embodiment of the invention will now be described in which the supply of film is maintained in a magazine casing 79 in a plurality of annular concentric rolls or coils. In the present instance, I construct a magazine so that it will accommodate three such rolls or coils indicated by the numerals 80, 81, and 82. In order to accomplish this, the casing 79 is provided with a cover plate 84 which is provided on its inner face with a plurality of circumferentially disposed rollers 85 disposed in three concentric sets. These rollers are indicated generally by the reference numerals 85, but the outer set is indicated specifically by the reference numeral 85a and the intermediate set by the reference numeral 85b, and the innermost set by the reference numeral 85c. These rollers are rotatably mounted on circumferentially disposed pins 86 which project inwardly on the inner side of the cover plate 84.

The film 87 is guided up into the casing 79 in substantially the same manner indicated in Figure 3, that is, it passes up an arcuate guide duct 88 provided with guide rollers 89 which enables the film to pass over a feed roller 90 at the upper side of the casing with which cooperates the usual presser rollers 91.

When the machine is in operation, the film passes onto the outer periphery of the outermost coil 80. Between the inner periphery of the outermost coil 80 and outer periphery of the intermediate coil 81, means are preferably provided for the feeding of the film from the outer coil to the intermediate coil. For this purpose, a feed roller 92 is provided similar to the feed roller 90, and this feed roller 92 and its cooperating presser roller 93 is carried on the cover plate 84. This feed roller 92 is mounted in a position to take the film from one of the rollers 85a and wrap it down onto the outer periphery of the coil 81.

Between the coils 81 and 82, a similar feed roller 94 is provided which cooperates with a presser roller 95, and these parts are also carried on the cover plate 84. This feed roller 94 operates to take the film off of the inner periphery of the intermediate coil 81 and wrap it on the outer periphery of the innermost coil 82.

The magazine is provided with a delivery feed roller 96 with its cooperating presser roller 97, and this feed device is also carried on the cover plate 84 and operates like the feed roller 48 of Figure 3 to take the film off of the inner periphery of the inner coil 82, and pass it down over the guide roller 98 and out of the magazine through a guide not illustrated, but similar to the guide 66 described in connection with Figure 3. This feed roller 96 is actuated in the same way as the feed roller 48 of Figure 3, that is, through the rotation of the driving plate of the magazine. However, in this case, the driving plate is not formed of a single piece as in Figure 3, but is formed of a center section or center plate 99, and annular sections 100, 102, and other sections further out on the driving plate to be described more fully hereinafter. The sections 99, 100, and 102 all touch the side of the inner coil 82. In order to drive the said roller 96, the inner end of this roller is provided with a pinion 103, which meshes with the teeth of an internal gear wheel 104 which is counter-sunk in the inner face of the center plate 99. These sections 99, 100, and 102 of the driving plate are not driven at the same angular velocity, but are driven so that their peripheries move at substantially the same peripherial speed which is substantially the same as the speed at which the film is advanced through the feeding device. In order to accomplish this, these sections are provided with integral tubular hubs 99a, 100a, and 102a, the outer hub 102a being rotatably mounted in a bearing 105 formed at the center of the back plate 83 of the casing. These hubs are provided respectively with pinions 106 which are of gradually increasing diameter in an outward direction so that the pinion of the hub 102a is of the largest diameter; and these pinions mesh respectively with correspondingly stepped driving gears 107; in other words, the gear ratio for the hub of the center plate 99 gives a greater number of revolutions per second than the corresponding drive for the section 100. Likewise, the section 102 is driven at a slower angular velocity than the intermediate section 100. In this way, these three sections are driven at substantially the same peripheral speed. The pinion that drives the innermost hub 99a is rigidly attached on a center shaft 108 that rigidly carries the hub 99a.

The gears 107 are carried on a common shaft 109 which is rotatably mounted in suitable bearings and provided with a gear such as a spiral gear 110 which is driven by meshing with a corresponding gear on a driving shaft (not illustrated).

The feed rollers 92, 94 and 96 all have a common drive which is effected through the medium of a substantially radial counter-shaft 111 carried on the cover plate 84 and carrying a gear such as spiral gear 112 at its inner end that meshes with a corresponding gear on the shaft 113 of the feed roller 96. Similar gearing 114 and 115 is provided for driving a shaft of the feed rollers 92 and 94 off of the counter-shaft 111 and through the medium of the extended shafts of these feed rollers as indicated in Figure 9.

In order to assist in effecting the rotation of the outer coils 80 and 81, the driving plate includes a number of annular sections beyond the section 102 (see Figure 9). In the present instance, I provide annular sections 116, 117, 118 and 119, and these sections are all driven so that they rotate at substantially the same peripheral speed as the inner sections 99, 100, and 102. In order to accomplish this, I provide the section or annulus 102 with a gear wheel 120 which meshes on its outer side with a pinion 121, the shaft of which extends through to the outer side of the back wall 83 of the casing where it carries the gear wheel or pinion 122. This pinion 122 drives a gear train 123 that effects the driving of all of the outer sections or annuluses 116 to 119 inclusive.

Each of these sections or rings, for example, the ring 116 is driven by the same means; in other words, the driving means is duplicated for all of the rings. This driving means consists of a gear wheel 124 attached to the back of each ring, and meshing on its outer side with a driving pinion 125 which is rigid on the shaft of a gear 126 of the gear train 123. Each gear 126 is driven by an idler 127 in the gear train.

Each ring 124 is supported for rotation on a plurality of rollers such as the roller 128 that is received in a groove 129 formed on the inner face of the ring. These rollers are rotatably mounted circumferentially on the inner face of the back wall 83 of the casing.

In order to prevent any possibility of a crack being formed between the segments or rings of the driving plate, the meeting faces or edge faces 130 of the center plate 99, and the sections 100 and 102 are preferably inclined or conical as indicated. For a similar reason, the meeting faces 131 between the outer annuluses 116—119 are also of inclined or conical form.

It will be noted that the innermost coil 82 is in contact with the center section 99, and the two sections 100 and 102. As these sections are all driven at approximately the same peripheral speed they urge the different wraps of the coil 82 to advance circumferentially at substantially the same linear speed.

The middle coil 81 is in contact with the two sections or rings 116 and 117 which also rotate at substantially this same peripheral speed and urge the wraps or layers of the coil 81 to advance circumferentially at the same linear speed.

The outermost coil 80 is engaged by the two outermost annuluses 118 and 119.

Figure 3A:
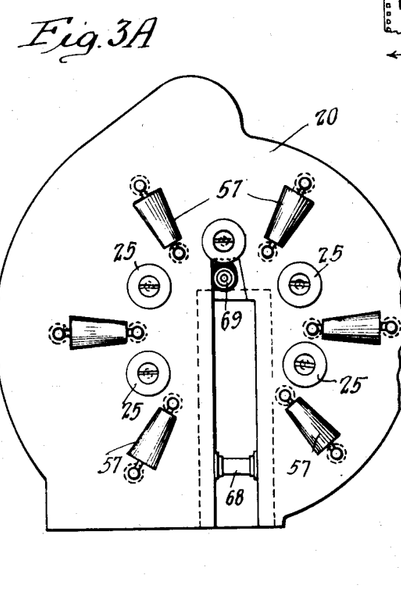
Figure 3a is an elevation of the inner face of the door of the magazine with the hinged edge of the door broken away.

The coils are all pressed yieldingly up against the driving plate which is composed of the sections and annuluses described above, by means of a plurality of substantially conical rollers 132 which are mounted in the cover plate 84. These rollers are constructed and mounted similarly to the conical rollers 57 of Figure 3a, but in the present instance, these rollers are mounted with their large ends toward the central axis of the magazine. If the rollers are mounted in this way, the peripheral speed at the large ends of the rollers being higher than the peripheral speed at the outer ends will tend to speed up the innermost wraps of each coil, and this is advantageous because at these points, there may be a tendency for the film to lag. These rollers are provided with springs and mounted substantially as illustrated in Figure 6.

In order to effect the driving of the feed roller 90 (see Figure 8), I prefer to provide a construction such as that illustrated in Figure 11. In this construction, the outermost drive pinion 125a that drives the outermost ring 119 also operates to drive an idler 133 mounted for rotation in the casing, and this idler drives a gear 134 which is rigidly mounted on the shaft 135 of the feed roller. In Figure 11, the film 87 is indicated in dotted lines passing over this feed roller.

In Figure 5, I illustrate a magazine embodying my invention mounted with its central axis in line with a projection lens assembly 136. In this embodiment of the invention, I employ a tubular center shaft instead of employing the closed center construction illustrated in Figure 4, and this enables me to provide alining openings 137 in the casing wall, and at these openings the projecting lamp 138 is supported on one side and the lens assembly 136 on the other side. The film 139 is then pulled down from the coil 140 with a step by step movement past the opening 137 with a Geneva feed device, and other mechanism such as illustrated in my co-pending application after which the film is returned to the outer side of the coil 140 by means described in this application; in this way, a very compact construction for the projecting apparatus results.

The mode of operation of the entire apparatus will now be briefly stated:

Referring to Figure 1, the film 1 is pulled down by the usual stop-movement feed device so as to draw it past the three lenses 3, 6, and 5 in succession. In doing this, the film is drawn off from the center of the coil 13. In passing from the lens 3, the film is guided into a twist, and at this twist, the film passes the lens 6. Beyond this point, the plane of the film rotates through another 90° at which time it passes the lens 5 and thence past the feed mechanism (not illustrated) and the film then returns through the guide 11 to the upper side of the magazine 2 where it is fed onto the outer periphery of the coil 13.

In the single coil type of magazine illustrated in Figure 3, the film 28 passes up through the curved guideway 29 and passes over a feed roller 32 which is continuously rotated at the linear speed at which the film travels past the lenses. As the film leaves this feed roller 32, it passes through guide rollers 34 which lay the film on the outer periphery of the coil 22. This coil is rotated in the direction of the arrow due to the rotation of the driving plate 27 and the rotation of the rollers 26. As the coil rotates, the film 28 passes inwardly over one of the guide rollers 25 and passes over a feed roller 48 from which the film passes out of the magazine to the guide 66, and thence down past the projecting lens or lenses of the projecting apparatus.

The delivery feed roller 48 that delivers the film from the magazine is, of course, also driven at a speed which will advance the film at the same rate, but the film is drawn past the lenses by the regular feed apparatus associated with the lenses. In connection with the cover plate or swinging door 20 (Fig. 4), it will be noted that this door carries the pinion 50 that is mounted on the shaft of the feed roller 48, and if the teeth of this pinion did not happen to strike the teeth of the internal gear wheel 51 in the proper position, the door would not close. For this reason, I provide the shaft 49 of this roller with the thumb head 53 which enables the pinion 50 to be adjusted slightly by rotation in either direction. This enables the pinion to be brought into proper position to mesh with the teeth of the gear wheel 51.

The coil is also spring pressed toward the driving plate 27 through the agency of the conical rollers 57. In the multiple coil magazine illustrated in Figures 8 to 11, inclusive, the film 87 enters the guide 88 of the magazine from below (see Figure 8), and passes over a feed roller 90, and this feeds the film onto the periphery of the outermost coil 80. This coil is supported and guided on the circumferentially disposed rollers 85, and as the coils rotate the film passes the feed roller 92 and is wrapped onto the outer periphery of the intermediate coil 81.

The intermediate coil 81 is supported on the intermediate ring of guide rollers 85b, and as this coil rotates, the film from it passes over the guide roller 94, and is led onto the outer periphery of the innermost coil 82. The inner periphery of this coil is supported on the ring of guide rollers 85c, and from this point, the film passes out over a delivery feed roller 96 that advances the film out of the magazine.

Due to the sectional character of the driving plate for this magazine, the wraps of the different coils are advanced substantially at the same linear speed. In other words, although the coils rotate as a whole their inner wraps are moving at a faster angular velocity than their outer wraps. On account of the fact that the lower part of each coil sags down, the layers in these sagged portions are slightly separated from each other. Most of the relative movement of the layers of film occurs in these sagged parts where the film layers are not touching each other. This is most advantageous as it avoids rubbing and wear on the coating carried by the film.

In the construction shown in Figure 5, the film 139 is drawn down with a stop movement apparatus to bring the "frames" of the film in succession past the central openings 137 in the casing which aline with the lens assembly 136, and the lamp 138. With this construction, it is not necessary to mount the magazine on the upper side of the casing such as the casing 10 illustrated in Figure 1.

Although I have illustrated the multiple coil type of magazine as being composed of three coils, it is obvious that if desired four or more such coils can be employed if the length of the endless film should make this necessary. Passing the film through the duct 11 has a cooling effect on the film before it passes back into the coil in the magazine.

It is understood that the embodiment of the invention described herein is only one of the many embodiments this invention may take, and I do not wish to be limited to the practice of my invention, nor in my claims, to the particular embodiment set forth.

What I claim is:

1. In a film magazine for a projecting machine, the combination of a casing, means associated with said casing for supporting and rotating a plurality of concentric annular coils of film constituting portions of the same film, a plurality of circumferentially disposed guide rollers mounted in the casing to rotate on relatively fixed axes and located between the said coils, means for effecting passage of the film between the annular coils, and means for feeding film from the casing.

2. In a film magazine for a projecting machine, the combination of a substantially circular casing having means for supporting and rotating a plurality of concentric annular coils of film constituting portions of the same film, a plurality of circumferentially disposed guide rollers mounted in the casing to rotate on relatively fixed axes and located between the said coils, means for guiding the film to pass the same between the annular coils, and means for feeding film from the casing.

3. In a film magazine for a projecting machine, the combination of a substantially circular casing having means for supporting and rotating a plurality of concentric annular coils of film constituting portions of the same film, a plurality of circumferentially disposed guide rollers located between the coils and mounted for rotation on fixed axes, means for guiding the film to pass the same between the annular coils, means for feeding film into the casing to pass into one of said coils, and means for feeding film from the casing and for effecting passage of the film from one to another of said coils.

4. In a film magazine for a projecting machine, the combination of a casing, means associated with the casing for supporting and rotating a plurality of concentric annular coils of film constituting portions of the same film, a plurality of circumferentially disposed guide rollers mounted to rotate on fixed axes in the casing and located between the said coils, means for guiding film into the casing and into the outermost of said annular coils, means for guiding film to pass the same between the annular coils, and means for feeding the film from the casing at the innermost of said annular coils.

5. In a film magazine for a projecting machine, the combination of a casing, means associated with the casing for supporting a plurality of concentric annular coils of film, a driving plate engaging the sides of said coils and having relatively movable concentric annular sections corresponding to the different coils, means for supporting said coils out of contact with each other, said casing having means for guiding the film to pass between the annular coils, and means for driving the sections of the driving plate of larger diameter at a relatively higher angular speed than the inner sections so as to maintain a substantially constant linear speed for the film in the different annular coils.

6. In a film magazine for a projecting machine, the combination of a casing, means associated with the casing for supporting a plurality of concentric annular coils of film, a driving plate engaging the sides of said coils and having relatively movable concentric annular sections corresponding to the different coils, said casing having means for guiding the film to pass between the annular coils, means for driving the sections of the driving plate of larger diameter at a relatively slower angular speed than the inner sections so as to maintain a substantially constant linear speed for the film in the different annular coils, feeding means located where the film is guided between the coils, and means for driving the said feeding means.

7. In a film magazine for a projecting machine, the combination of a casing, means associated with the casing for supporting a plurality of concentric annular coils of film, a driving plate engaging the sides of said coils and having relatively movable concentric annular sections corresponding to the different coils, said casing having means for guiding the film to pass between the annular coils, means for driving the sections of the driving plate of larger diameter at a relatively slower angular speed than the inner sections so as to maintain a substantially constant linear speed for the film in the different annular coils, feeding means located where the film is guided between the coils, means for driving the said feeding means, means for feeding film into the casing, and means for feeding film out of the casing.

8. In a film magazine for a projecting machine, the combination of a casing, means associated with the casing for supporting a plurality of concentric annular coils of film, a driving plate engaging the sides of said coils and having relatively movable concentric annular sections corresponding to the different coils, said casing having means for guiding the film to pass between the annular coils, and means for driving the sections of the driving plate of larger diameter at a relatively slower angular speed than the inner sections so as to maintain a substantially constant linear speed for the film in the different annular coils, said sections of the driving plate having substantially conical meeting faces operating to prevent the edges of the film from passing into the joints between said sections.

9. In a film magazine for a projecting machine, the combination of a casing, means associated with the casing for supporting a plurality of separate concentric annular coils of film, each coil consisting of a plurality of layers of the film, means for holding the annular coils separated from each other, a driving plate engaging the sides of said coils and having relatively movable concentric annular sections corresponding to the different coils, said casing having means for guiding the film to pass it between the annular coils, gear wheels attached to the said annular sections respectively, pinions corresponding to the gear wheels for driving the sections, and a gear train for driving the pinions so that the pinions and the gear wheels have substantially the same peripheral speed.

10. In a film magazine for a projecting machine, the combination of a casing, means for supporting a coil of film therein, a driving plate having a plurality of annular concentric sections for engaging the side of the coil to rotate the coil, means for feeding film into the coil, means for withdrawing film from the coil, said annular sections having concentric tubular hubs, and means for driving said hubs at different angular velocities so that the annular sections of smaller diameter move at substantially the same linear speed as the outer annular sections, said concentric sections cooperating to advance the film at substantially the same linear velocity at all points in the coil.

11. In a film magazine for a projecting machine, the combination of a casing, means for supporting a coil of film therein, means for feeding film into the coil, means for feeding film out of the coil, a driving plate for engaging the side of the coil for advancing the same, having a center section, and having annular sections concentric with said center section, and means for driving said center section and said annular sections at different angular velocities so as to enable the driving plate to transmit motion to the plies of the coil at substantially the same linear velocity throughout the entire coil.

12. In a film magazine for a projecting machine, the combination of a casing, a plurality of sets of circumferentially disposed rotary guide members located in the same plane substantially at right angles to a common axis, dividing the interior of the casing into a plurality of annular concentric coil chambers of progressively increasing diameter and enabling the magazine to carry a film disposed in a plurality of separated coils of different diameters located in the same plane and corresponding to the said coil chambers, means located between the annular coils for feeding the film between the same, means for feeding the film into the casing, and means for feeding the film out of the casing.

13. In a film magazine for a projecting machine, the combination of a casing, a central shaft in the casing, means for supporting and holding a supply of film consisting of a plurality of separate concentric annular coils of different diameters substantially co-axial with the said shaft, and with the annular coils in the same plane, rotary means for engaging the coils to cooperate in effecting a rotation of the coils, feeding mechanism disposed between the coils for feeding the film in a general radial direction from one annular coil to another, means for driving the said feeding mechanisms from the said shaft, means for feeding film into the casing, and means for feeding film out of the casing.

14. In a film magazine for a projecting machine, the combination of a casing, a central shaft in the casing, means for supporting a supply of film consisting of a plurality of separate concentric annular coils substantially co-axial with the said shaft, rotary means for engaging the coils to cooperate in effecting a rotation of the coils, feeding mechanism disposed between the coils for feeding the film from one coil to another, means for driving the said feeding mechanisms from the said shaft, means for feeding film into the casing, means for feeding film out of the casing, and means for driving said last named means from the said central shaft.

15. In a film magazine for a projecting machine, the combination of a casing, a rotary back-plate in the casing in a substantially vertical plane, for engaging the side of a coil of film held in the casing and mounted to rotate on a substantially horizontal axis, a cover plate for the front of the casing, rollers mounted in the cover plate for engaging the forward side of the coil with resilient means located at each end of each roller for yieldingly pressing them against the coil, and means for rotating the back-plate to cause rotation of the coil.

16. In a film magazine for a projecting machine, the combination of a casing, a rotary back-plate mounted in the casing for engaging the side of a coil of film held in the casing, a cover plate for the forward side of the casing, means for rotating the back-plate on a substantially horizontal axis, said cover plate having a guide opening therein substantially on the axis of rotation of the back-plate, a feed-roller mounted on the cover plate adjacent said guide opening, a gear wheel coaxial with the back-plate and carried thereby, and a pinion carried by the feed-roller and meshing with the said gear wheel for feeding film from the inside of the coil outwardly through said guide opening.

17. In a film magazine for a projecting machine, the combination of a casing, a rotary back-plate in the casing in a substantially vertical plane, for engaging the side of a coil of film held in the casing, and mounted to rotate on a substantially horizontal axis, a cover plate for the front of the casing, radially disposed rollers mounted in the cover plate for engaging the forward side of the coil, a spring at each end of each roller for pressing the rollers against the side of the coil to hold the coil against the back-plate, and means for rotating the back-plate.

18. In a film magazine for a projecting machine, the combination of a casing, a rotary back-plate mounted in the casing for engaging the side of a coil of film held in the casing, a cover plate for the forward side of the casing, rollers mounted on the inner side of the cover plate for supporting the coil of film, means for rotating the back-plate on a substantially horizontal axis, a gear wheel carried coaxially by the back-plate, a feed-roller rotatably mounted in the cover plate and having a pinion at its inner end for engaging the said gear wheel for rotating the feed-roller when the back-plate rotates, said cover plate having a guideway therein extending from a point near the said axis of rotation for guiding the film outwardly from the casing as it leaves said feed-roller.

19. In a film magazine for a projecting machine, the combination of a casing, a rotary back-plate mounted in the casing for engaging the side of a coil of film held in the casing, a hinged cover plate for the forward side of the casing, rollers mounted on the inner side of the cover plate for supporting the coil of film, means for rotating the back-plate on a substantially horizontal axis, a gear wheel carried coaxially by the back-plate, a feed-roller rotatably mounted in the cover plate and having a pinion at its inner end for engaging the said gear wheel for rotating the feed-roller when the back-plate rotates, said pinion having a shaft with a head carried thereby on the exterior of the cover plate and enabling the pinion to be rotated by hand when the cover plate is swung on its hinges into its closed position, said cover plate having a guideway therein extending from a point near the said axis of rotation for guiding the film outwardly from the casing as it leaves said feed-roller.

20. In a film magazine for a projecting machine, the combination of a casing, a central shaft in the casing, means for supporting and holding a supply of film consisting of a plurality of separate concentric annular coils of different diameters substantially coaxial with the said shaft, and with the annular coils in the same plane, rotary means for engaging the coils to cooperate in effecting a rotation of the coils, a cover plate for the casing, a feed-roller having a shaft rotatably mounted in the cover plate and having a pinion at its inner end, a driven gear wheel for meshing with the pinion to drive the same, a plurality of feed-rollers having shafts rotatably mounted in said cover plate for engaging the film between the said separate concentric coils, and means carried on the cover plate driven by the shaft of said pinion for driving the second-named feed rollers.

21. In a film magazine for a projecting machine, the combination of a casing, a rotary back-plate in the casing in a substantially vertical plane for engaging the side of a coil, a coil held in the casing and mounted to rotate on a substantially horizontal axis, a cover plate for the front of the casing, conical rollers mounted in the cover plate for engaging the forward side of the coil mounted to rotate on substantially radial axes, means for yieldingly pressing each roller individually against the coil, and means for rotating the back-plate to cause rotation of the coil, said conical rollers operating to rotate by their contact with the side of the coil and tending to separate the layers of the coil and reduce rubbing of the layers of the coil on each other.

ALBERT B. SCOTT.